C. Haskins,
Universal Joint.
N°69,662. Patented Oct. 8, 1867.

Witnesses;
John L. Lewis
Charles Ketchum

Inventor;
Charles Haskin

United States Patent Office.

CHARLES HASKINS, OF PENN YAN, NEW YORK.

Letters Patent No. 69,662, dated October 8, 1867.

---

IMPROVEMENT IN UNIVERSAL COUPLING.

---

The Schedule referred to in these Letters Patent and making part of the same.

---

TO ALL WHOM IT MAY CONCERN:

Be it known that I, CHARLES HASKINS, of Penn Yan, in the county of Yates, and State of New York, have invented a new and useful Improvement in Universal Coupling; and I do hereby declare that the following is a full, clear, and exact description of the construction and operation of the same, reference being had to the annexed drawing making a part of this specification, in which—

The letters of reference refer to the same parts in each figure.

The nature of my invention consists in making a universal coupling that may be readily put together and taken apart without bolts or pins. It is prevented from coming apart when one axis is oblique to the other by means of a ledge on the inside of each part of the coupling. It allows either shaft to move endwise, and thus prevent friction at the journal-boxes, as when used between a horse-power and thresher, when either by use is moved from its proper position. It may be run either way, and either part may be the driver or the driven.

To enable others skilled in the art to make and use my invention, I will proceed to describe its mode of construction and operation.

Figure 1:
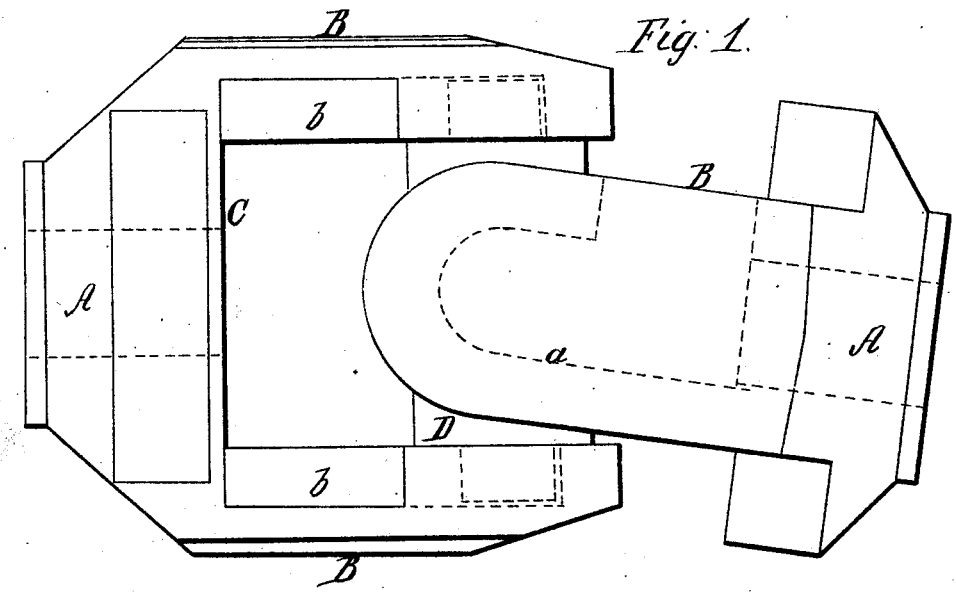
Figure 1 is an external view of the whole coupling.
Figure 2:
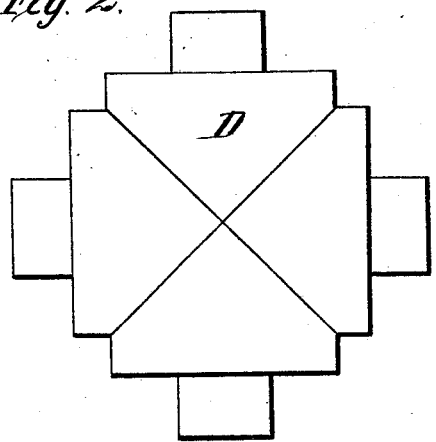
Figure 2 is a view of the cross-connection.

A is the body of each of the parts of the coupling. They have a hole through them, either round or square, to receive the end of the shaft on which they are fastened. The holes are represented by dotted lines in each part in fig. 1. Each of them has a ledge, C, between the arms, as shown in fig. 1. B, B, and B, are the arms. There are two to each body, and they are made to correspond, and are alike on each body. Their size and length may be varied to suit the place or use to which they may be applied. They must be made thick enough to admit a channel in the inside for the pivots of the cross D. The shape of the channels is represented by the dotted lines $a$ in fig. 1, and the depth of the channels by $b$ and $b$, which are notches in the rim around the channels. These notches are to put the pivots into when the coupling is to be put together. From these notches to the outer end the arm may be increased in length to correspond with the machinery they are used to connect. C is a ledge. It is the same width as the arms, and extends from one to the other, and is made on the body A. Its use is to prevent the coupling from parting when the bodies come towards each other when they are not in line, and this is done by means of the end of the arm B coming in contact with the ledge. D is a cross, made in shape as represented in fig. 2. The length of each part is the same as distance between the arms B and B. At each of the ends is a pivot that must be made to fit into the channels, inside of the arms, and move freely.

Having thus fully described my invention, what I claim as new, and desire to secure by Letters Patent, is—

1. The channels $a$ in the arms B, and ledge C between the arms, as and for the purpose hereinset forth.

2. I claim the cross D, when provided with pivots, as described, and used to connect the two parts of universal coupling, substantially as specified.

CHARLES HASKINS.

Witnesses:
JOHN L. LEWIS,
CHARLES KETCHUM.